(12) United States Patent
Spiegel

(10) Patent No.: US 6,644,804 B1  
(45) Date of Patent: Nov. 11, 2003

(54) SUNGLASSES ATTACHED TO EYEGLASSES USING REPELLING MAGNETIC FORCE

(76) Inventor: H. Jay Spiegel, P.O. Box 444, Mt. Vernon, VA (US) 22121

( * ) Notice: Subject to any disclaimer, the term of this patent is extended or adjusted under 35 U.S.C. 154(b) by 0 days.

(21) Appl. No.: 10/227,797

(22) Filed: Aug. 27, 2002

(51) Int. Cl.[7] .................................................. G02B 9/00
(52) U.S. Cl. ........................................ 351/47; 351/57
(58) Field of Search .................................. 351/47, 57

(56) References Cited

U.S. PATENT DOCUMENTS

| | | | |
|---|---|---|---|
| 5,642,177 A | 6/1997 | Nishioka | 351/47 |
| 5,936,700 A | 8/1999 | Masunaga | 351/47 |
| 5,975,691 A | 11/1999 | Ku | 351/47 |
| 6,012,811 A | 1/2000 | Chao et al. | 351/47 |
| 6,109,747 A | 8/2000 | Chao | 351/47 |
| 6,116,730 A | 9/2000 | Kwok | 351/47 |
| 6,116,732 A | 9/2000 | Xiao | 351/47 |
| 6,120,144 A | 9/2000 | Park | 351/47 |
| 6,132,040 A | 10/2000 | Xiao | 351/47 |
| 6,139,141 A | 10/2000 | Zider | 351/57 |
| 6,149,269 A | 11/2000 | Madison | 351/47 |
| 6,164,774 A | 12/2000 | Cate | 351/47 |
| 6,170,948 B1 | 1/2001 | Chao | 351/47 |
| 6,170,949 B1 | 1/2001 | Mauch | 351/47 |
| 6,231,179 B1 | 5/2001 | Lee | 351/47 |
| 6,305,656 B1 | 10/2001 | Wemyss | 248/309.4 |
| 6,331,057 B1 | 12/2001 | Strube | 351/47 |
| RE37,545 E | 2/2002 | Chao | 351/57 |
| 6,343,858 B1 | 2/2002 | Zelman | 351/47 |
| 6,352,342 B1 | 3/2002 | Huang | 351/47 |
| 6,354,703 B1 | 3/2002 | Sadler | 351/57 |
| 6,364,478 B1 | 4/2002 | Jagasia | 351/47 |
| 6,367,926 B1 | 4/2002 | Chao et al. | 351/47 |
| 6,375,321 B1 | 4/2002 | Lee et al. | 351/47 |
| 6,382,787 B1 | 5/2002 | Xie | 351/47 |
| 6,402,318 B1 | 6/2002 | Xiao | 351/57 |

*Primary Examiner*—Huy Mai  
(74) *Attorney, Agent, or Firm*—H. Jay Spiegel

(57) ABSTRACT

Sunglasses are designed to be removably attached to existing eyeglasses using magnetic repelling force. The existing eyeglasses may have lenses to which are attached, on the outboard sides, temples that curve around from the plane of the eyeglass lenses and to which are pivotably attached ear pieces. On the inboard side of the lenses, a bridge interconnects them. The sunglasses have a bridge to which is attached, to either side, sunglass lenses. The attachment means consists of a rearwardly facing arm on the sunglasses to which a magnet is affixed, at each location, and magnets affixed on the eyeglasses in alignment with the magnets on the sunglasses. At each side of the eyeglasses, L-shaped brackets are provided that have C-shaped cross-sections. The magnets are arranged, on each side of the eyeglasses and sunglasses, respectively, so that when the sunglasses are placed into adjacency with the eyeglasses, like poles of the adjacent magnets face one another to create a repelling force therebetween. The repelling force forces the magnets carried on the sunglasses rearwardly away from the magnets carried on the eyeglass frames, and into a recess formed by the C-shaped cross-section of the L-shaped brackets. The repelling force between the magnet pairs retains the magnets carried by the sunglasses within the recesses in the L-shaped brackets to maintain the sunglasses mounted on the eyeglasses.

27 Claims, 2 Drawing Sheets

SUNGLASSES ATTACHED TO EYEGLASSES USING REPELLING MAGNETIC FORCE

BACKGROUND OF THE INVENTION

The present invention relates to sunglasses attached to eyeglasses using repelling magnetic force. In the prior art, it is known to use magnetic force to releasably affix sunglasses to eyeglasses. Various ways of accomplishing this feat are proposed in the prior art including fastening means located outboard of each eyeglass rim, and fastening means operating at the location of the bridge of the eyeglasses and sunglasses. In the case of magnetic fastening means located outboard of the eyeglass rims, several different methods are proposed including those permitting magnetic fastening along a horizontal plane, from above or below, along a vertical plane, from in front, from behind, or laterally. In the case of magnetic fastening means operating at the location of the bridge of the sunglasses and eyeglasses, fastening means operating from in front as well as from behind are well known.

The following prior art is known to Applicant:

| | |
|---|---|
| 5,642,177 to Nishioka | 6,170,949 to Mauch |
| 5,936,700 to Masunaga | 6,231,179 to Lee |
| 5,975,691 to Ku | 6,305,656 to Wemyss |
| 6,012,811 to Chao et al. | 6,331,057 to Strube |
| 6,109,747 to Chao | 6,343,858 to Zelman |
| 6,116,730 to Kwok | 6,352,342 to Huang |
| 6,116,732 to Xiao | 6,354,703 to Sadler |
| 6,120,144 to Park | 6,364,478 to Jagasia |
| 6,132,040 to Xiao | 6,367,926 to Chao et al. |
| 6,139,141 to Zider | 6,375,321 to Lee et al. |
| 6,149,269 to Madison | 6,382,787 to Xie |
| 6,164,774 to Cate | 6,402,318 to Xiao |
| 6,170,948 to Chao | RE37,545 to Chao. |

The present invention distinguishes from the teachings of these patents as contemplating the use of the repelling force of adjacent like poles of separate magnets to releasably fasten sunglasses to eyeglasses. Each of the above-listed patents relies upon the attractive force of adjacent magnets with opposite poles facing one another to releasably fasten sunglasses to eyeglasses.

SUMMARY OF THE INVENTION

The present invention relates to sunglasses attached to eyeglasses using repelling magnetic force. The present invention includes the following interrelated objects, aspects and features:

(1) In a first aspect, the present invention is directed to sunglasses designed to be removably attached to existing eyeglasses. The existing eyeglasses may have eyeglass rims to which are attached, on the outboard sides, frame pieces or temples that curve around from the plane of the eyeglass lenses to a direction approximately 90° rotated therefrom, facing rearwardly, and to which are pivotably attached ear pieces designed with distal ends placeable over the ears of the user to affix the eyeglasses to the head of the user. On the inboard side of the eyeglass rims, a bridge interconnects them and nose pieces may be provided to cushion the nose when the eyeglasses are supported thereon.

(2) The sunglasses usable in accordance with the teachings of the present invention have a bridge to which is attached, to either side, sunglass rims which carry sunglass lenses that can be permanently tinted or can, if desired, be of the "PHOTOGRAY" type which darkens upon exposure to light, and lightens when the ambient light intensity diminishes.

(3) The present invention contemplates magnetic attachment means designed to releasably attach the sunglasses to the eyeglasses. In accordance with the teachings of the present invention, the attachment means consists of a rearwardly facing arm on the sunglasses to which a magnet is affixed, at each location, and magnets affixed on the eyeglasses in alignment with the magnets on the sunglasses.

(4) At each side of the eyeglasses, just outboard of the eyeglass rims, L-shaped brackets are provided that have C-shaped cross-sections. The magnets are arranged, on each side of the eyeglasses and sunglasses, respectively, so that when the sunglasses are placed into adjacency with the eyeglasses, like poles of the adjacent magnets face one another to create a repelling force therebetween. The repelling force forces the magnets carried on the sunglasses rearwardly away from the magnets carried on the eyeglass frames, and into a recess formed by the C-shaped cross-section of the L-shaped brackets. The repelling force between the magnet pairs retains the magnets carried by the sunglasses within the recesses in the L-shaped brackets to maintain the sunglasses mounted on the eyeglasses. The sunglasses are easily removed by moving them and their magnets toward the eyeglasses magnets and then upwardly.

(5) If desired, lateral stoppers may be provided within the C-shaped cross-sectional channel of the L-shaped brackets to preclude lateral movement of the sunglasses with respect to the eyeglasses.

(6) If desired, the present invention is equally usable in conjunction with eyeglasses and sunglasses in which the lenses are of the rimless support type in which fasteners are inserted through the lenses themselves to attach a bridge between the lenses and to attach temples and earpieces outboard of the lenses.

Accordingly, it is a first object of the present invention to provide sunglasses attached to eyeglasses using repelling magnetic force.

It is a further object of the present invention to provide such a device in which an L-shaped bracket is employed to retain the sunglasses in position under the repelling force of adjacent magnets.

It is a still further object of the present invention to provide such a bracket having a C-shaped cross-section designed to retain the sunglasses in vertical orientation with respect to the eyeglasses.

It is a yet further object of the present invention to provide such an invention in which lateral stoppers are provided to maintain lateral alignment between the eyeglasses and sunglasses.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
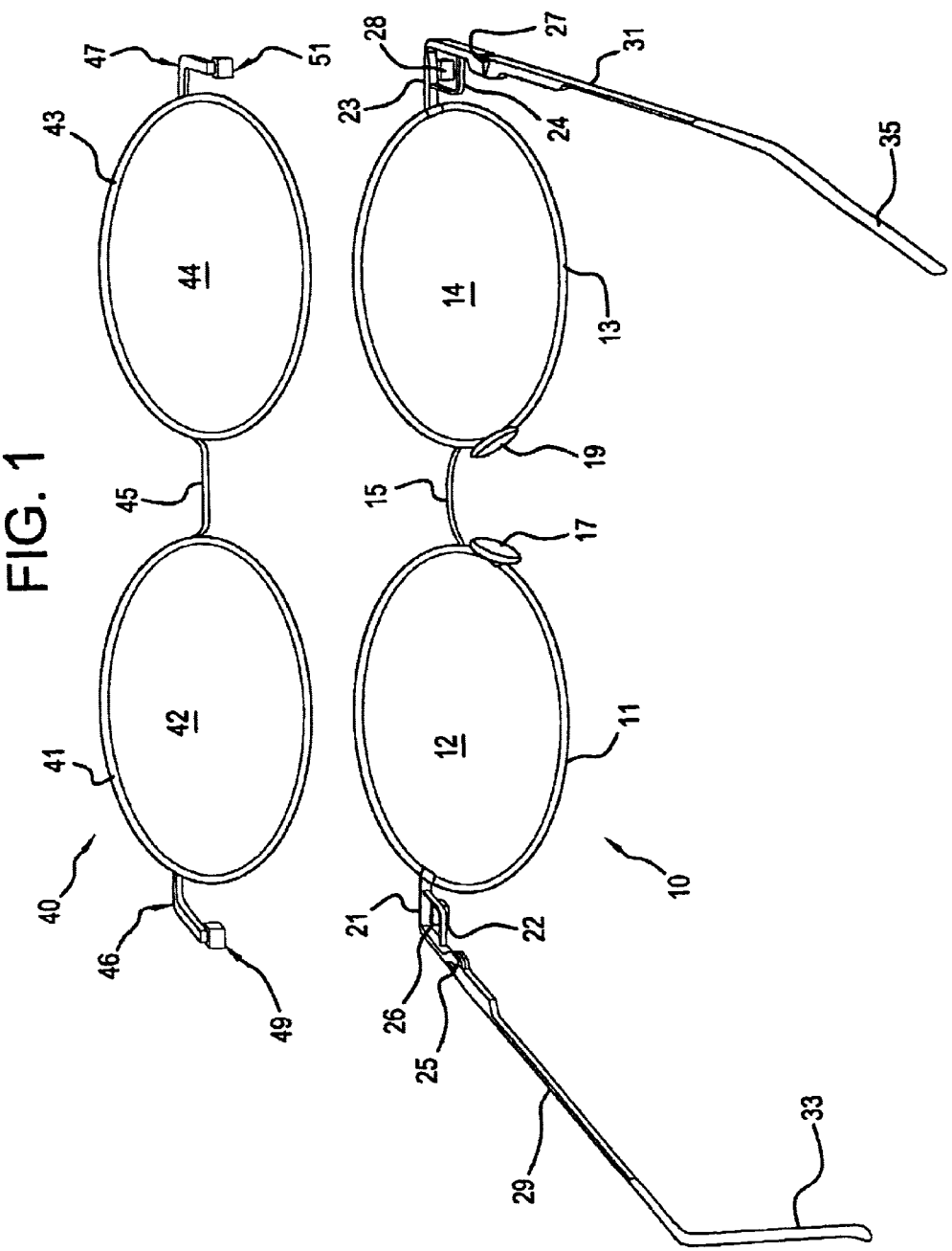
FIG. 1 shows an exploded perspective view of the present invention.

With reference, first, to FIG. 1, a pair of eyeglasses in accordance with the teachings of the present invention are generally designated by the reference numeral 10 and are seen to include eyeglass rims 11 and 13 connected together by a bridge 15 with nose pieces 17 and 19 provided for well known purposes. Temples 21 and 23 extend outwardly from the rims 11 and 13, respectively, and include substantially right angle bends so that their ends remote from the eyeglass rims extend rearwardly.

With further reference to FIG. 1, the temples 21 and 23 have respective hinges 25 and 27 connecting to respective ear pieces 29 and 31 that have respective ends 33 and 35 designed to fit over the ears of the user. Eyeglass rim 11 carries the lens 12, while eyeglass rim 13 carries the lens 14.

The temple 21 carries an L-shaped bracket 22, while the temple 23 carries an L-shaped bracket 24. The temple 21 also carries a magnet 26, while the temple 23 also carries a magnet 28. This structure is also seen, generally, with reference to FIG. 2.

With further reference to FIG. 1, sunglasses in accordance with the teachings of the present invention are generally designated by the reference numeral 40 and include sunglass rims 41 and 43 with the sunglass rim 41 holding a sunglass lens 42 and with the rim 43 holding a sunglass lens 44. A bridge 45 interconnects the rims 41 and 43. Temples 46 and 47 are attached, respectively, outboard of the rims 41 and 43. At the rear termination of the temple 46, a magnet 49 is provided. At the rear termination of the temple 47, a magnet 51 is provided.

Figure 4:
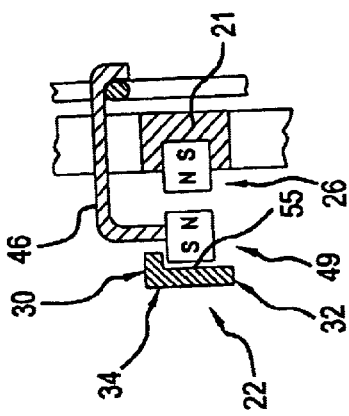
FIG. 4 shows a cross-sectional view along the line 4—4 of FIG. 3.
Figure 3:
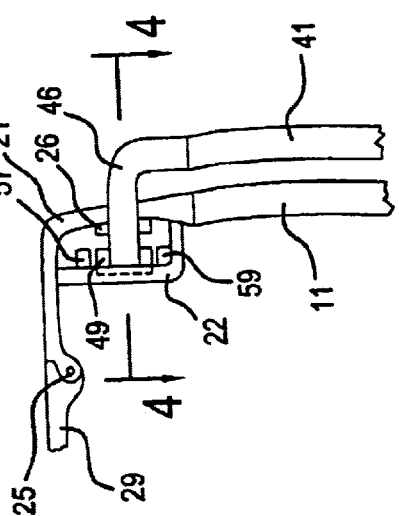
FIG. 3 shows a view similar to that of FIG. 2 but enlarged to show details.

With reference, now, to FIGS. 3 and 4, a better understanding of the attachment means releasably holding the sunglasses 40 to the eyeglasses 10 will now be described. As seen in FIG. 4, the L-shaped bracket 22 has a C-shaped cross-section, the cross-section including horizontal legs 30 (top) and 32 (bottom), and a vertical leg 34. The legs create an internal chamber 55 having a vertical dimension slightly larger than the vertical dimension of the magnet 49. As best seen in FIG. 3, the bracket 22 may include lateral stoppers 57 and 59 which limit the ability of the magnet 49 to move laterally within the channel 55.

With particular reference to FIG. 4, it is seen that the magnets 26 and 49 are oriented so that in the position shown in FIGS. 3 and 4, in particular, like poles face one another. In the example shown, with particular reference to FIG. 4, the North poles "N" face one another. The invention operates equally effectively where the South poles "S" face one another in the view of FIG. 4.

In the operation of the present invention, in the view of FIG. 4, the magnet 49 is lowered from above the magnet 26 and bracket 22 until it enters the space between the magnet 26 and the chamber 55. The repelling force created between adjacent magnets with like poles facing one another causes the magnet 49 to be repelled from the magnet 26 and into the chamber 55 where it is captured between the legs 30 and 32 to preclude vertical movement with respect to the bracket 22. The lateral stoppers 57 and 59 (FIG. 3) preclude lateral movement of the magnet 49 within the bracket 22.

Figure 2:
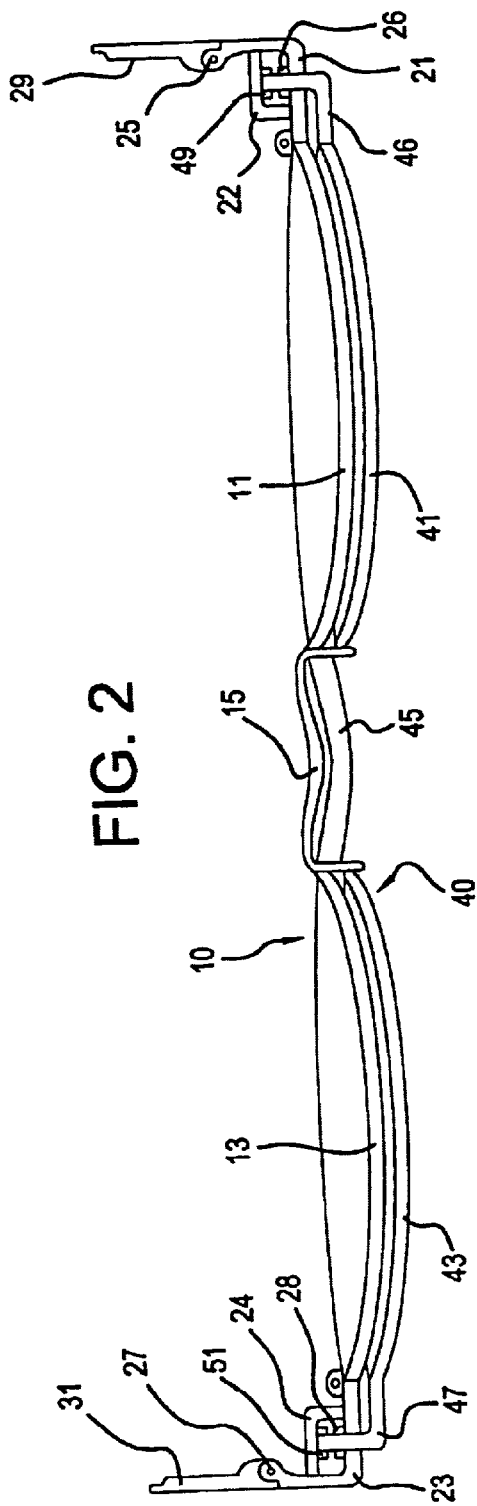
FIG. 2 shows a top view of the present invention as assembled.

The repelling force between the magnets 26 and 49 (and correspondingly between the magnets 28 and 51) maintains the magnet 49 within the channel 55 of the bracket 22 and the magnet 51 within the corresponding channel (not shown) within the bracket 24 (see FIG. 2). In this way, the sunglasses 40 are releasably retained on the eyeglasses 10.

The repelling force between the adjacent magnets with like poles facing one another provides an additional advantage nowhere taught or suggested by the prior art. That advantage is the fact that the repelling force between the adjacent magnets acts as a "shock absorber" so that if the eyeglasses 10, sunglasses 40 combination is jarred, the sunglasses 40 may slightly move away from the eyeglasses 10 through the cushioning effect of the repelling force between the adjacent magnets and, once the jarring has ceased, the magnets 49 and 51 will again restore their locations within the respective brackets 22 and 24. The sunglasses are easily removed from the eyeglasses by moving them and their magnets toward the eyeglasses magnets and then upwardly.

It is noted, with reference to FIG. 4, that the temple 46 includes a downwardly extending projection 48 to which the magnet 49 is affixed. The temple 47 has similar structure to which the magnet 51 is affixed.

As such, an invention has been disclosed in terms of a preferred embodiment that fulfills each and every one of the objects of the invention as set forth hereinabove, and provides a new and useful pair of sunglasses attached to eyeglasses using repelling magnetic force of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. Attachment means for releasably coupling sunglasses to eyeglasses, comprising:
   a) said eyeglasses including a pair of eyeglass lenses and a temple outboard of each eyeglass lens, each temple having a first magnet mounted thereon and a bracket having a surface spaced from and facing said first magnet;
   b) said sunglasses including a pair of sunglass lenses and a temple outboard of each sunglass lens, each temple having a rearwardly extending appendage carrying a second magnet;
   c) said magnets being so oriented that when respective first and second magnets are in adjacency, like poles of said magnets face one another to cause a repelling force therebetween;
   d) whereby said sunglasses are coupled to said eyeglasses by lowering said second magnets between respective ones of said first magnets and bracket surfaces so that repelling force between adjacent first and second magnets causes said second magnets to engage said bracket surfaces to couple said sunglasses to said eyeglasses.

2. The attachment means of claim 1, wherein said eyeglass temples are L-shaped, each having a first leg extending outwardly generally parallel to said eyeglass lenses and a second leg extending rearwardly from an end of said first leg remote from a respective eyeglass lens.

3. The attachment means of claim 2, wherein each respective first magnet is mounted on a respective temple first leg.

4. The attachment means of claim 2, wherein each bracket is L-shaped and is connected between said temple first and second legs.

5. The attachment means of claim 1, wherein each said bracket has a C-shaped cross-section, said cross-section including a vertical leg carrying said bracket surface, and upper and lower legs substantially perpendicular to said vertical leg.

6. The attachment means of claim 5, wherein a distance between an upper surface of said lower leg and a lower surface of said upper leg is slightly greater than a height of each said second magnet.

7. The attachment means of claim 6, wherein a distance between a forward edge of said upper leg and a rearwardly facing surface of said first magnet is slightly greater than a thickness of each said second magnet.

8. The attachment means of claim 7, wherein said like poles are North poles.

9. The attachment means of claim 7, wherein said like poles are South poles.

10. The attachment means of claim 5, wherein said bracket surface, a lower surface of said upper leg, and an upper surface of said lower leg form a chamber adapted to receive said second magnet.

11. The attachment means of claim 10, wherein said chamber includes laterally spaced walls laterally enclosing a second magnet to preclude lateral movement thereof within said chamber.

12. The attachment means of claim 1, wherein said like poles are North poles.

13. The attachment means of claim 1, wherein said like poles are South poles.

14. The attachment means of claim 1, wherein said rearwardly extending appendage has a downwardly depending termination to which a said second magnet is affixed.

15. Attachment means for releasably coupling sunglasses to eyeglasses, comprising:
   a) said eyeglasses including a pair of eyeglass lenses and a temple outboard of each eyeglass lens, said eyeglass temples being L-shaped, each having a first leg extending outwardly generally parallel to said eyeglass lenses and a second leg extending rearwardly from an end of said first leg remote from a respective eyeglass lens, each temple having a first magnet mounted thereon on a said first leg and a bracket having a surface spaced from and facing said first magnet, each bracket being L-shaped and being connected between said temple first and second legs;
   b) said sunglasses including a pair of sunglass lenses and a temple outboard of each sunglass lens, each temple having a rearwardly extending appendage with a downwardly depending termination to which a second magnet is affixed;
   c) said magnets being so oriented that when respective first and second magnets are in adjacency, like poles of said magnets face one another to cause a repelling force therebetween;
   d) whereby said sunglasses are coupled to said eyeglasses by lowering said second magnets between respective ones of said first magnets and said bracket surfaces so that repelling force between adjacent first and second magnets causes said second magnets to engage said bracket surfaces to couple said sunglasses to said eyeglasses.

16. The attachment means of claim 15, wherein each said bracket has a C-shaped cross-section, said cross-section including a vertical leg carrying said bracket surface, and upper and lower legs substantially perpendicular to said vertical leg and wherein a distance between an upper surface of said lower leg and a lower surface of said upper leg is slightly greater than a height of each said second magnet.

17. The attachment means of claim 16, wherein a distance between a forward edge of said upper leg and a rearwardly facing surface of said first magnet is slightly greater than a protruding thickness of each said second magnet.

18. The attachment means of claim 17, wherein said bracket surface, a lower surface of said upper leg, and an upper surface of said lower leg form a chamber adapted to receive a said second magnet.

19. The attachment means of claim 18, wherein said chamber includes laterally spaced walls laterally enclosing a second magnet to preclude lateral movement thereof within said chamber.

20. An attachment device for releasably coupling an auxiliary lens to eyeglasses comprising a first magnet mounted on said eyeglasses and a second magnet mounted on said auxiliary lens, said magnets being placed in adjacency whereby like poles of said respective magnets face one another, repelling force between said like poles causing interacting structures of said auxiliary lens and said eyeglasses to releasably couple said auxiliary lens to said eyeglasses.

21. The device of claim 20, wherein said auxiliary lens comprises sunglasses.

22. The device of claim 20, wherein said first magnet comprises a plurality of first magnets and said second magnet comprises a plurality of second magnets, whereby respective pairs of first and second magnets are placed in adjacency with like poles facing one another.

23. The device of claim 20, wherein said like poles are North poles.

24. The device of claim 20, wherein said like poles are South poles.

25. The device of claim 20, wherein said eyeglasses include a side extension on which said first magnet is mounted.

26. The device of claim 21, wherein said eyeglasses include a side extension on which said first magnet is mounted.

27. The device of claim 26, wherein said sunglasses have a side extension having a rearwardly extending appendage carrying said second magnet.

* * * * *